United States Patent [19]

Fawcett et al.

[11] Patent Number: 4,489,560
[45] Date of Patent: Dec. 25, 1984

[54] COMPOUND INTERNAL COMBUSTION ENGINE AND METHOD FOR ITS USE

[75] Inventors: Sherwood L. Fawcett, Columbus; James N. Anno, Cincinnati, both of Ohio

[73] Assignee: Battelle Development Corporation, Columbus, Ohio

[21] Appl. No.: 401,265

[22] Filed: Jul. 23, 1982

Related U.S. Application Data

[63] Continuation-in-part of Ser. No. 123,544, Feb. 22, 1980.

[51] Int. Cl.³ .............................................. F02B 37/00
[52] U.S. Cl. ........................................ 60/605; 123/68
[58] Field of Search ...................... 60/605; 418/33, 35; 123/64, 68

[56] References Cited

U.S. PATENT DOCUMENTS

| | | | |
|---|---|---|---|
| 1,339,176 | 5/1920 | Dyer | 123/64 X |
| 1,609,371 | 12/1926 | Leissner | 123/68 |
| 2,349,967 | 5/1944 | Javal | 123/68 |
| 3,859,789 | 1/1975 | Fawcett et al. | 418/33 X |

Primary Examiner—Michael Koczo
Attorney, Agent, or Firm—Thomas H. Murray; Clifford A. Poff

[57] ABSTRACT

A compound internal combustion engine having an efficiency materially higher than that of an engine operating on the conventional Otto or Diesel cycle. This is accomplished by using the heat of the exhaust gases to compress air, with or without the addition of fuel, which is then injected into the cylinder or cylinders of the engine just prior to ignition. In this manner, less heat is rejected from the overall cycle with improved efficiency. In the preferred embodiment of the invention, a portion of the unused heat energy in the exhaust gases is used in a unidirectional energy converter to compress air or an air/fuel mixture which is then injected into the cylinders of the engine. The exhaust gases and air or the air/fuel mixture are exhausted and introduced in an expansion space in the converter through substantially immediately adjacent ports. The engine, whether it should operate on the Otto or Diesel cycle, does not compress gas on the upstroke of the piston until the compressed gas from the unidirectional energy converter is injected into the cylinder.

23 Claims, 10 Drawing Figures

COMPOUND INTERNAL COMBUSTION ENGINE AND METHOD FOR ITS USE

CROSS-REFERENCE TO RELATED APPLICATION

This application is a continuation-in-part of application Ser. No. 123,544, filed Feb. 22, 1980.

BACKGROUND OF THE INVENTION

As is known, the Otto thermodynamic cycle involves adiabatic compression (i.e., the compression stroke) from some inlet condition of pressure and volume as the piston moves upwardly in the cylinder. This is followed by an isochoric (i.e., constant volume) pressure rise due to ignition, and then adiabatic expansion during the power stroke. The hot gases are then exhausted during the exhaust stroke. The Diesel cycle is similar except that adiabatic compression is followed first by an isochoric pressure rise due to ignition and then by an isobaric addition of heat (i.e., burning of fuel) prior to adiabatic expansion in the power stroke.

In both the Otto and Diesel cycles, the efficiency of the engine is:

$$N = \frac{Q_A - Q_R}{Q_A}$$

where $Q_A$ is the heat added and $Q_R$ is the heat rejected, much of this rejected heat being in the exhaust gases. At a typical compression ratio of 8, the ideal efficiency of an engine operating on the Otto cycle is about 56.5%; but in actual practice, the efficiency is only about 30%. This is reflected in much higher exhaust temperatures than those which are calculated from ideal, theoretical calculations. For example, almost 60% of the energy supplied by combustion of fuel in an internal combustion engine is expelled with the exhaust gases. Needless to say, if some of this otherwise wasted energy can be fed back to the combustion cycle, considerable improvement in efficiency can be achieved.

SUMMARY OF THE INVENTION

In accordance with the present invention, part of the heat contained in exhaust gases emanating from an internal combustion engine is converted into useful work, thereby improving the efficiency of the engine.

In carrying out the invention, an oxygen-containing gas which is to be injected into a cylinder of an internal combustion engine is compressed with the use of energy derived from the exhaust gases issuing from the engine, followed by injecting the compressed gas into the cylinder as the piston approaches the top of the cylinder just prior to ignition of fuel mixed with the gas. The fuel can be mixed with the gas in a conventional carburetor prior to compression or, in the case of a Diesel cycle, can be injected directly into the cylinder along with the compressed gas. The intake valve means in the cylinder is controlled such that during the upstroke of the piston prior to ignition, essentially no compression of gas occurs until just prior to the time that the piston reaches its uppermost position where the gas, compressed with heat energy derived from the exhaust gases, is injected into the cylinder. Thus, the energy normally required for the compression stroke in a conventional internal combustion engine is substantially reduced.

The means for converting heat energy in the exhaust gases to energy in the form of a compressed gas is preferably performed in a unidirectional energy converter such as that shown and described in U.S. Pat. No. 3,859,789, issued Jan. 14, 1975. High-temperature pressurized exhaust gas from an internal combustion engine is fed into the unidirectional energy converter where the gas energy is initially converted to kinetic energy of pistons. Once expanded, the exhaust gas is discharged from the converter and a fresh air or air/fuel mixture is taken into the compressor region of the converter, compressed to the desired pressure by the energy of the pistons, and then discharged into the cylinders of the engine.

In a specific embodiment of the invention, the unidirectional energy converter comprises a continuous, closed-loop passageway containing a plurality of freely-movable bodies or pistons. Means are provided in one region of the passageway for propelling the bodies in one direction around the passageway with the use of exhaust gases from an internal combustion engine. In another region of the passageway beyond the first region, means are provided for converting at least a portion of the kinetic energy of the propelled bodies into energy in the form of a compressed gas. This compressed gas is then conducted through intake valves into the engine with the intake and/or exhaust valves being controlled such that there is essentially no compression of gas in the cylinders prior to the introduction of the charge from the unidirectional energy converter.

The new subject matter of this continuation-in-part application provides that in the foregoing method and internal combustion engine, aspiration of an oxygen-containing gas into the continuous, closed-loop passageway occurs immediately after expanded gas is exhausted from the passageway. Ducts are preferably arranged to extend generally tangentially and in opposite general directions from intake and exhaust ports in the passageway. The exhaust gas is passed through an exhaust port situated in the outer circumference of the passageway. The oxygen-containing gas is aspirated through a port in the inner circumference of the passageway.

The above and other objects and features of the invention will become apparent from the following detailed description taken in connection with the accompanying drawings which form a part of this specification, and in which.

Figure 1:
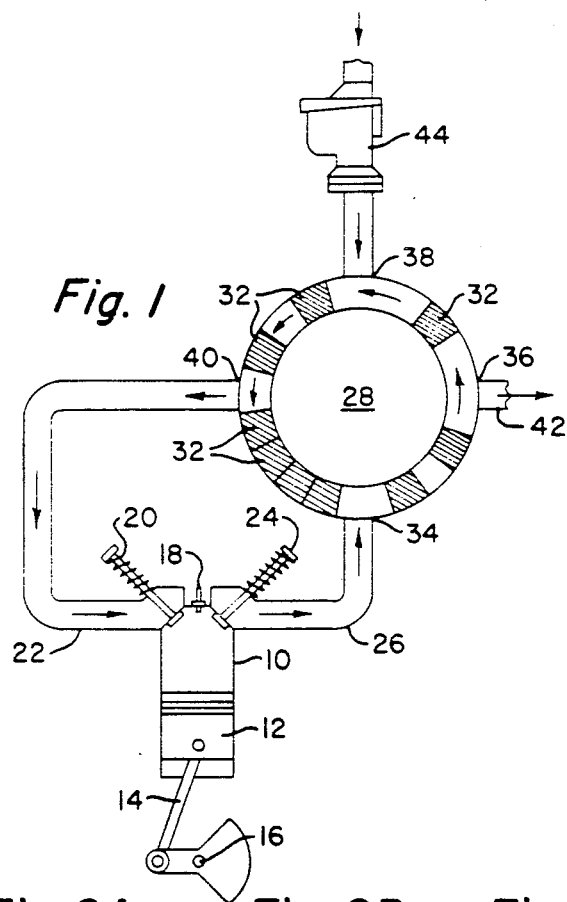
FIG. 1 is a schematic illustration of one embodiment of the invention.
Figures 2A, 2B, 2C, 2D:
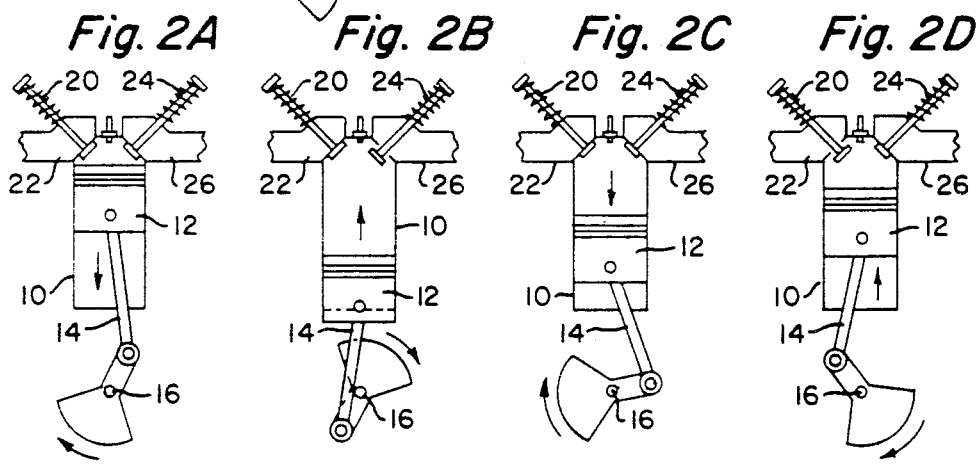
FIGS. 2A through 2D illustrate various positions of the piston and valves of the engine of the invention at various points in an Otto cycle.
Figure 3:
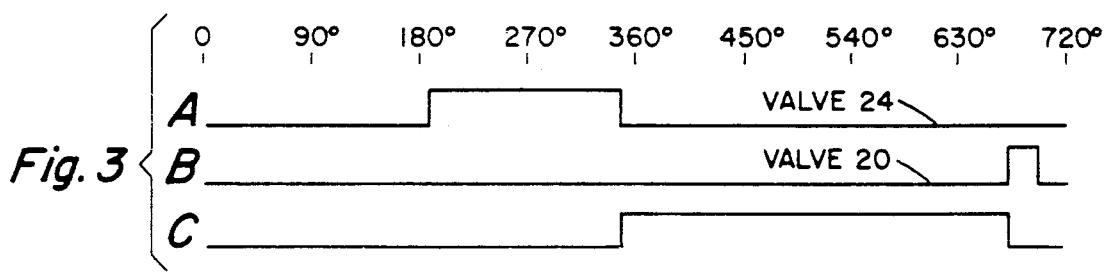
Figure 4:
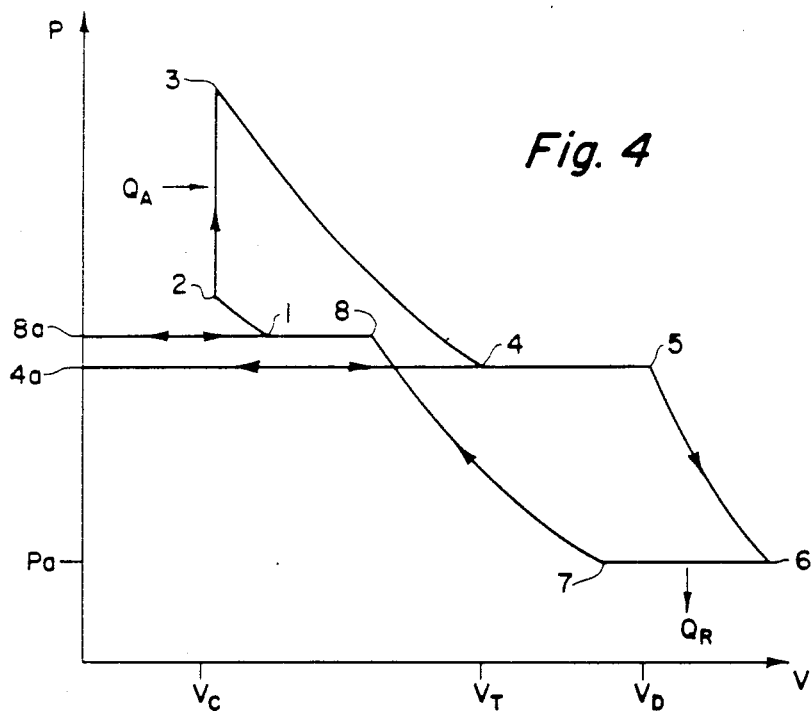
Figure 5:
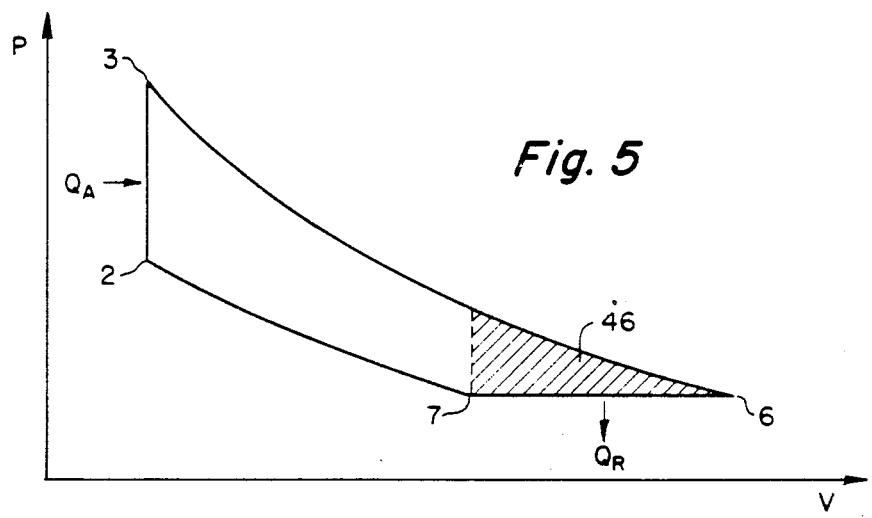
Figure 6:
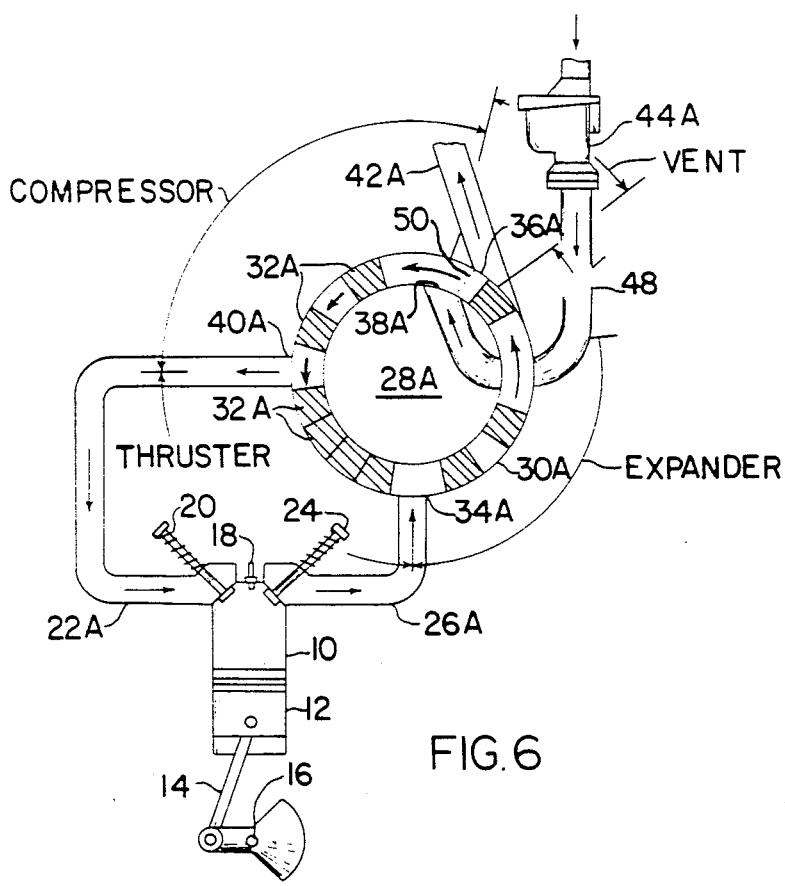
Figure 7:
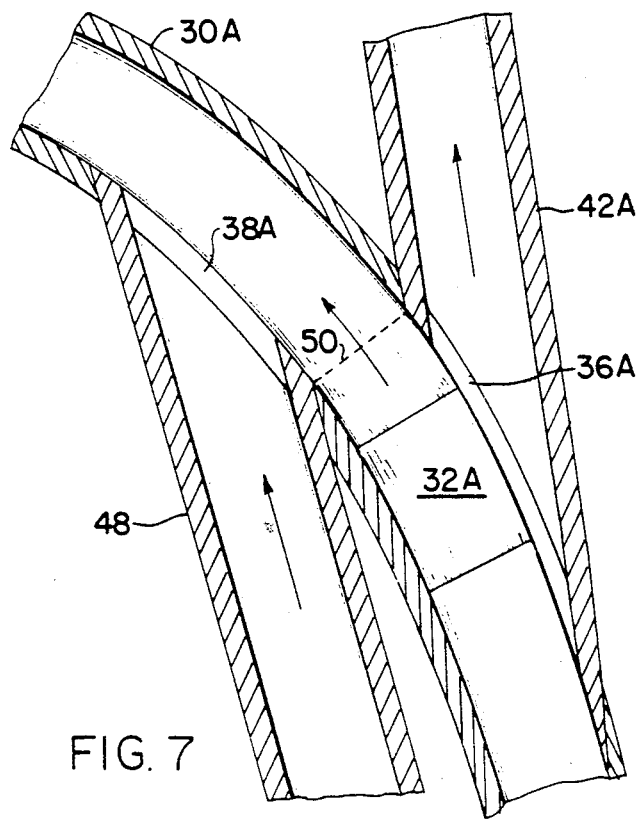

FIG. 3 comprises timing waveforms for the inlet and exhaust valves of the embodiment of the invention shown in FIGS. 1 and 2;

FIG. 4 is a plot of pressure versus volume illustrating the thermodynamic cycle of the engine of the invention;

FIG. 5 is a simplified showing of the thermodynamic cycle illustrated in FIG. 4;

FIG. 6 is a schematic illustration similar to FIG. 1 illustrating an embodiment according to this continuation-in-part application; and FIG. 7 is an enlarged sectional view of a segment of a closed-loop passageway with intake and exhaust ducts communicating therewith.

With reference now to the drawings, and particularly to FIG. 1, a cylinder 10 of an internal combustion engine is shown having a piston 12 reciprocable therein and connected through a piston rod 14 to a crankshaft 16. It will be assumed, for purposes of illustration, that the engine is a gasoline engine which operates on the Otto cycle and is provided with a spark plug 18. An inlet valve 20 is adapted to connect the top of the cylinder with an intake manifold 22; while an exhaust valve 24 is adapted to connect the cylinder with an exhaust manifold 26. The cams and rocker arms for actuating the valves are not shown for purposes of simplicity.

Both the intake and exhaust manifolds 22 and 26 are connected to a unidirectional energy converter, generally indicated by the reference numeral 28. The energy converter comprises a continuous, closed-loop circular passageway 30 (schematically shown in cross section) having a plurality of freely-movable bodies or pistons 32 therein. The pistons 32 comprise cylindrical, curved elements having a radius of curvature corresponding to the radius of curvature of the closed-loop passageway 30. Alternatively, the pistons 32 may comprise spheres or other geometries conforming to the passageway. The tolerance or clearance between the surfaces of the pistons 32 and the inside walls of the closed-loop passageway 30 is such as to permit the pistons to move freely through the passageway. However, fluid flow past the pistons within the passageway is substantially prevented. Additionally, the pistons may be equipped with conventional piston rings. The continuous, closed-loop passageway 30 is provided with four ports 34, 36, 38 and 40 spaced around the passageway 30 at intervals of about 90°. Port 34 is connected to the exhaust manifold 26 as shown; whereas port 40 is connected to the intake manifold 22. Port 36 is connected to an exhaust pipe 42 which discharges into the atmosphere; while port 38 is connected to the outlet side of a conventional carburetor 44.

The continuous, closed-loop passageway 30 is divided into regions or zones, the region between ports 34 and 36 comprising an expander section where exhaust gases entering port 34 cause successive ones of the pistons 32 to be propelled around the passageway 30 in a counterclockwise direction as viewed in FIG. 1. That is, the hot exhaust gases from the engine enter the passageway 30 and expand adiabatically, imparting kinetic energy in the form of increased forward velocity to each piston 32; while the gas between successive ones of the pistons is reduced in temperature. As the pistons pass port 36, the cooler exhaust gases, which have adiabatically expanded, exit to the atmosphere; while the pistons 32 continue on to port 38 where they draw in a mixture of fuel and air from the carburetor 44. Between ports 38 and 40, the air/fuel mixture is compressed, the compressed gas exiting through port 40 to the intake manifold 22. Between ports 40 and 34, the pistons 32, in a thruster region, move downwardly under gravity and in abutment to the point where they are again propelled in a counterclockwise direction by the exhaust gases to repeat the cycle. In the thruster region, the force of gravity acting on the pistons balances the forces around the passageway; however other means, such as a ratchet-type latch, can be used in the thruster region to prevent backward movement of the pistons under the influence of the entering exhaust gases. Thus, exhaust gases entering port 34 propel the pistons 32 around the closed-loop passageway 30; while the compressed mixture of fuel and air entering port 38 is compressed and exits through port 40 to the intake manifold 22.

In FIGS. 6 and 7, the same reference numerals have been applied to parts which are identical to the parts described in regard to FIG. 1 and the suffix "A" has been applied to reference numerals identifying parts which correspond to the parts which are described in regard to FIG. 1. The intake and exhaust manifolds 22A and 26A, respectively, are connected as before to a unidirectional energy converter 28A. The continuous, closed-loop circular passageway 30A has a radius of curvature corresponding to a radius of curvature of pistons 32A which are cylindrical curved elements or may comprise spheres or other geometries conforming to the passageway to permit the pistons to move freely through the passageway. Fluid flow past the pistons within the passageway is substantially prevented and the pistons may be equipped with conventional piston rings. The passageway 30A is provided with four ports 34A, 36A, 38A and 40A which are spaced around the passageway and form regions or zones. An expander section is formed by the region between ports 34A and 36A which, for example, extends about 120° around the passageway wherein exhaust gases entering port 34A cause successive ones of the pistons 32A to be propelled around the passageway in a counterclockwise direction as viewed in FIG. 6. The hot exhaust gases expand adiabatically, imparting kinetic energy in the form of increased forward velocity to each piston 32A throughout the region of the expander section; while the gas between successive ones of the pistons is reduced in temperature. As the pistons pass port 36A, the cooler exhaust gases pass from the port which is situated at the outer circumferential wall of the passageway into an exhaust pipe 42A for exhausting into the atmosphere. The exhaust pipe extends in a generally tangential direction to receive the exhaust gases with a minimum of obstruction after expanding in a unit cell between pistons and moving with a forward velocity. Immediately, or at least substantially immediately thereafter, oxygen-containing gas is aspirated into the passageway through port 38A from an intake header pipe 48. The flow of oxygen-containing gas in pipe 48 is admixed with fuel from carburetor 44A. The region between exhaust port 36A and intake port 38A is denoted in FIG. 6 as a vent. Demarcation line 50 denotes the termination of exhaust port 36A which is immediately adjacent the starting point of intake port 38A. A relatively small arcuate spacing may be provided between ports 36A and 38A, if desired. Intake port 38A is situated in the wall at the inner circumference of the passageway so that aspiration occurs due to the Bernoulli effect. The dynamics of fluid flow are enhanced at port 38A by the lower pressure of a pressure differential that exists between the inside circumferential wall and the outside circumferential wall of the closed-loop passageway in this area. In this regard, the mass of the pistons and any gas which exists in a unit cell between pistons is subject to the inertial effect of movement about the closed-loop passageway. It will also be observed in regard to FIGS. 6 and 7 that the flow of exhaust gases in pipe 42A and oxygen-containing gas in pipe 48 is in a generally parallel relation, although this is not essential. The flow of gases in pipes 42A and 48 at areas adjacent the respective ports is in opposite directions with respect to the closed-loop passageway.

Between ports 38A and 40A, the fuel, oxygen-containing air mixture is compressed. Thus, the region between these ports is denoted in FIG. 6 as a compressor. The compressed mixture exits through port 40A to the intake manifold 22A. Between ports 40A and 34A a region denoted in FIG. 6 as a thruster, is formed wherein the pistons 32A abut and move downwardly under gravity to a point where they are again propelled in a counterclockwise direction by exhaust gases to repeat the cycle. As described hereinbefore a ratchet-type latch or other means can be used in the thruster to prevent backward movement of the pistons under the influence of entering exhaust gases through passageway 34A.

The principle of the invention will be explained in connection with a four-cycle or four-stroke engine; however it will be appreciated that it can be used equally well with two-cycle engines. The various strokes of a four-cycle engine are shown in FIGS. 2A-2D. In FIG. 2A, the power stroke is illustrated with the piston 12 moving downwardly and the crankshaft 16 rotating in a clockwise direction. Shortly after initiation of downward movement of the piston 12 during the power stroke, the mixture of fuel and air above the piston is ignited; and in the case of an Otto cycle it is ignited by the spark plug 18. During this time, both the intake and exhaust valves 20 and 24 are closed.

FIG. 2B illustrates the exhaust stroke of the piston 12. During this time, the piston moves upwardly with the exhaust valve 24 open to force hot exhaust gases into the exhaust manifold 26 and, thence, to the inlet port 34 of the unidirectional energy converter 28. At the completion of the exhaust stroke, the exhaust valve 24 closes and the piston again descends as shown in FIG. 2C. It will be appreciated that in a conventional Otto cycle, the intake valve 20 is open during the downward stroke shown in FIG. 2C to draw into the cylinder a mixture of unpressurized air and fuel. However, it will be noted in FIG. 2C that in the present invention the intake valve 20 remains closed during this downward stroke of the piston.

In FIG. 2D, the piston 12 again moves upwardly in what ordinarily would be the compression stroke in a conventional Otto cycle with the fuel/air mixture being compressed prior to ignition while valves 20 and 24 remain closed. In accordance with the present invention, however, the valve 20 remains closed until the piston 12 reaches the approximate position shown in FIG. 2D. At this time, the intake valve 20 opens and the compressed fuel/air mixture from outlet port 40 of the unidirectional energy converter 28 enters the cylinder 10 where it is again ignited by the spark plug 18 after valve 20 closes to repeat the cycle.

In FIG. 3, the timing waveforms for the valves 20 and 24 are shown. When the timing waveform rises above the zero axis, the valve is open; and when it is on the zero axis the valve is closed. The time period for two complete revolutions of the crankshaft 16 or 720° is shown in FIG. 3. Zero degrees in FIG. 3 represents the point at which the piston 12 begins its downward movement on the power stroke. The exhaust valve 24 (waveform A) remains closed until the crankshaft rotates through 180°, whereupon it opens between 180° and 360° as the piston moves upwardly to exhaust the gases from the cylinder 10. The valve 20, however, whose timing waveform is identified as waveform B in FIG. 3, does not open until almost two complete revolutions of the crankshaft 16 have occurred after ignition. That is, the valve 20 opens at about the 690° mark and remains open only momentarily, during which time the compressed gas from the unidirectional energy converter 28 is forced into the cylinder.

It will be appreciated that as the piston 12 moves downwardly in FIG. 2C with both valves 20 and 24 closed, a partial vacuum will be created above the piston. However, as the piston again moves upwardly as shown in FIG. 2D, atmospheric pressure acting on the bottom of the piston will assist in the upward movement with the overall effect that no net work (gain or loss) has been accomplished. If desired, a third valve can be provided for the cylinder which would have a timing waveform illustrated by waveform C in FIG. 3. This valve, not shown, would open at 360°; at the start of the downward stroke of the piston shown in FIG. 2C, and would remain open until just prior to the injection of compressed air from intake manifold 22. The result would be the same, namely no net work being done during the downward and upward strokes of the piston shown in FIGS. 2C and 2D until the high pressure fuel/air mixture is injected into the cylinder with the intake valve 20 open. It will be appreciated that valve timing will vary in minor degrees from this illustration for "fine tuning" of the engine operation.

An exaggerated thermodynamic cycle for the engine just described in connection with FIGS. 2A-2D is shown in FIG. 4. The compressed air/fuel mixture is combusted at constant volume, $V_C$, while causing a pressure rise from points 2 to 3. During combustion, heat, $Q_A$, is added. The hot gas then undergoes adiabatic expansion from points 3 to 4 while the piston 12 moves downwardly during the power stroke as illustrated in FIG. 2A. At this point, the gas at volume $V_T$ is exhausted at constant pressure to the unidirectional energy converter 28 or 28A (points 4 to 4a). During this time, the piston 12 is moving upwardly as illustrated in FIG. 2B with exhaust valve 24 open. While in the unidirectional energy converter, the cell volume increases from zero to some volume, $V_O$, between points 4a and 5 at constant pressure. Ideally, points 4 and 5 will coincide. The gas is then adiabatically expanded to atmospheric pressure in the unidirectional energy converter 28 or 28A between ports 34 or 34A and 36 or 36A, respectively, this adiabatic expansion occurring between points 5 and 6 in FIG. 4. At this point, heat, $Q_R$, is rejected at atmospheric pressure $P_a$; and fresh air is taken in through port 38 or 38A and compressed between ports 38 or 38A and 40 or 40A in the converter 28 or 28A, respectively (between points 7 and 8 in FIG. 4). The unit cell between pistons then collapses to point 8a; and the gas is pushed into the cylinder with intake valve 20 open at point 1 in FIG. 4. Again, ideally points 1 and 8 coincide. The piston then compresses the gas adiabatically to the original point; whereupon the cycle repeats.

Since points 4 and 5 ideally coincide, as do points 1 and 8, the resulting simplified ideal thermodynamic cycle is that shown in FIG. 5 wherein the shaded area 46 comprises the net work added to a conventional Otto cycle. It will be appreciated, of course, that a similar result will occur in the Diesel cycle, except that the fuel need not necessarily be mixed with air prior to compression but may be injected directly into the cylinder as is conventional. Further, if the exhaust gas energy is excessive to run the unidirectional energy converter, part of the waste gas may be bypassed by the use of a conventional "wastegate".

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A method for operating an internal combustion engine having at least one piston reciprocable within a cylinder, which comprises the steps of introducing an oxygen-containing gas into an expansion space defined by means outside said cylinder substantially immediately after expanding exhaust gases issuing from the engine in said expansion space, compressing the oxygen-containing gas which is to be injected into the cylinder in said expansion space with the use of energy derived from expanded exhaust gases, and injecting said compressed gas into said cylinder as said piston approaches the top of the cylinder just prior to ignition of fuel mixed with the gas.

2. The method of claim 1 including the step of mixing said fuel with gas prior to its injection into the cylinder.

3. The method of claim 1 wherein said engine has an exhaust stroke and including the step of preventing the entrance of an external source of gas or an expandable medium into the cylinder during the downstroke of said piston following said exhaust stroke.

4. The method of claim 1 including the step of substantially preventing compression of gas in the cylinder during the upstroke of said piston prior to ignition of fuel until said gas is injected into the cylinder.

5. The method of claim 1 wherein said cylinder is provided with intake valve means, and maintaining the intake valve means closed at all times except when said gas is injected into the cylinder.

6. The method of claim 1 wherein said cylinder is provided with intake valve means, and controlling the intake valve means to prevent substantial compression of gas within the cylinder during the upstroke of said piston prior to ignition of fuel until said gas is injected into the cylinder.

7. The method of claim 1 in which said gas is compressed by movement of pistons around a continuous, closed-loop passageway into which said exhaust gases are injected.

8. The method of claim 7 including the steps of adiabatically expanding said exhaust gases between successive ones of said pistons in a first region of said continuous passageway to thereby propel successive ones of the pistons in one direction around the passageway, exhausting said exhaust gases from the passageway in a second region of the passageway beyond said first region, said step of introducing an oxygen-containing gas including introducing air between successive pistons in a third region of said passageway which is immediately adjacent said second region, said step of compressing including compressing the air between successive pistons in said passageway in a fourth region which is beyond said third region, extracting said compressed gas from said passageway, and returning said successive ones of the pistons through a first region of said passageway back to said first region where they are again propelled by said exhaust gases.

9. The method according to claim 8 wherein said step of exhausting includes passing exhaust gases through a port in the outer circumference of said passageway.

10. The method according to claim 8 or 9 wherein said step of introducing includes direction air through a port in the inner circumference of said passageway.

11. A method for operating an internal combustion engine having at least one piston recirpocable within a cylinder, which comprises the steps of igniting a compressed air/fuel mixture and combusting the same within said cylinder, adiabatically expanding the combusted mixture to move the aforesaid piston downwardly in said cylinder, expelling the exhaust gases of combustion from said cylinder while said piston moves upwardly, adiabatically further expanding said exhaust gases in means having an expansion space after expulsion from said cylinder, introducing an oxygen-containing gas into said expansion space substantially immediately after adiabatically further expanding the exhaust gases and employing the energy derived from said adiabatically expanded exhaust gases to adiabatically compress an oxygen-containing gas in said expansion space, and introducing said compressed oxygen-containing gas into said cylinder as said piston moves upwardly in the cylinder and approaches the top of the cylinder prior to ignition of said air/fuel mixture.

12. The method of claim 11 wherein substantially all of said adiabatic compression of said oxygen-containing gas takes place external to said cylinder.

13. The method of claim 11 wherein said further adiabatic expansion of said exhaust gases and substantially all of said adiabatic compression of said oxygen-containing gas takes place external to said cylinder.

14. The method of claim 11 wherein said exhaust gases are introduced into a continuous, closed-loop passageway containing a plurality of freely-movable pistons, the pistons being propelled around the passageway by said adiabatic expansion of the exhaust gases, and utilizing the kinetic energy of the pistons thus propelled to compress said oxygen-containing gas.

15. The method of claim 14 wherein said expansion space is between successive ones of said pistons being propelled around the passageway, said step of adiabatically further expanding the exhaust gases including exhausting the adiabatically-expanded exhaust gases from said closed-loop passageway, and said step of introducing an oxygen-containing gas including feeding such gas into the passageway between successive ones of said propelled pistons, and wherein said step of compressing includes compressing the oxygen-containing gas between successive ones of said pistons.

16. The method of claim 11 including the further step of combusting said air/fuel mixture at constant volume in said cylinder.

17. The method of claim 11 burning said air/fuel mixture at constant pressure in said cylinder after said step of combusting.

18. In an internal combustion engine, a cylinder, a piston reciprocable within said cylinder, a continuous, closed-loop passageway, a plurality of freely-movable bodies disposed within said passageway, means in one region of the passageway for propelling said bodies in one direction around the passageway with the use of exhaust gases from said internal combustion engine, means for exhausting exhaust gases from said passageway, means substantially immediately adjacent said means for exhausting for introducing an oxygen-containing gas into said passageway, means in another region of the passageway for converting at least a portion of the kinetic energy of the propelled bodies into energy in the form of a compressed oxygen-containing gas, means for conducting said compressed gas to said cylinder during the upstroke of said piston as it approaches the top of the cylinder prior to ignition of fuel within the cylinder, and means for preventing substantial compression of gas within said cylinder during the upstroke of said piston and prior to conduction of said compressed gas to the cylinder.

19. The internal combustion engine of claim 18 wherein said compressed gas comprises a mixture of air and fuel derived from a carburetor.

20. The internal combustion engine of claim 18 wherein said internal combustion engine is a diesel engine, and said compressed gas comprises air.

21. The internal combustion engine of claim 18 wherein said passageway has four ports spaced around its periphery, one of said ports being connected to a source of exhaust gases under pressure from said internal combustion engine, a second of said ports defining said means for exhausting exhaust gases from the passagewway after said bodies have been propelled, a third of said ports defining said means for introducing, and a fourth of said ports acting to convey compressed gas to said cylinder of the internal combustion engine.

22. The internal combustion engine of claim 18 wherein said means in one region of the passageway propel said bodies within said passageway by adiabatic expansion of said exhaust gases.

23. In an internal combustion engine, a cylinder, a piston reciprocable within said cylinder, intake and exhaust valves within the cylinder, intake and exhaust manifolds adapted to be connected to said cylinder through their respective intake and exhaust valves, a continuous, closed-loop passageway, a plurality of freely-movable bodies disposed within said passageway, means in one region of the passageway for propelling said bodies in one direction around the passageway with the use of exhaust gases from said internal combustion engine, means in another region of the passageway for converting at least a portion of the kinetic energy of the propelled bodies into energy in the form of a compressed gas, four ports spaced around the periphery of said passageway, means connecting one of said ports to said exhaust manifold, a second of said ports acting to exhaust said exhaust gases from the passageway after said bodies have been propelled, a third of said ports being substantially immediately adjacent the second of the ports and acting to draw gas to be compressed into said passageway, means connecting a fourth of said ports to said intake manifold, and means for controlling said intake valve such that it opens only as said piston approaches the top of said cylinder prior to ignition of fuel within the cylinder.

* * * * *